(12) United States Patent
Logan et al.

(10) Patent No.: US 7,031,980 B2
(45) Date of Patent: Apr. 18, 2006

(54) MUSIC SIMILARITY FUNCTION BASED ON SIGNAL ANALYSIS

(75) Inventors: Beth T. Logan, Somerville, MA (US); Ariel Salomon, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 10/004,157

(22) Filed: Oct. 31, 2001

(65) Prior Publication Data

US 2002/0181711 A1 Dec. 5, 2002

Related U.S. Application Data

(60) Provisional application No. 60/245,417, filed on Nov. 2, 2000.

(51) Int. Cl.
*G06F 17/30* (2006.01)
(52) U.S. Cl. ............... 707/104.1; 707/10; 707/101; 348/722
(58) Field of Classification Search ............ 707/1, 707/3, 5, 7, 10, 104.1; 84/609; 704/223, 704/243; 360/13; 348/722, 180; 324/536
See application file for complete search history.

(56) References Cited

U.S. PATENT DOCUMENTS

| | | | | |
|---|---|---|---|---|
| 4,591,928 A * | 5/1986 | Bloom et al. | ............... | 360/13 |
| 5,918,223 A | 6/1999 | Blum et al. | ............... | 707/1 |
| 6,201,176 B1 * | 3/2001 | Yourlo | ............... | 84/609 |
| 6,545,485 B1 * | 4/2003 | Sanderson | ............... | 324/536 |
| 6,678,655 B1 * | 1/2004 | Hoory et al. | ............... | 704/223 |
| 6,710,822 B1 * | 3/2004 | Walker et al. | ............... | 348/722 |
| 2005/0232411 A1 * | 10/2005 | Srinivasan et al. | ............... | 379/413 |

OTHER PUBLICATIONS

Blackburn, S., et al., "A Tool for Content Based Navigation of Music," *ACM Multimedia 98—Electronic Proceedings* (1998).
McNab, R., et al., "Towards the Digital Music Library: Tune Retrieval from Acoustic Input," Proceedings Digital Libraries 1996, pp. 11-18, (1996).
Ghias, A., et al., "Query By Humming— Musical Information Retrieval in an Audio Database," *ACM Multimedia 95— Electronic Proceedings*, (Nov. 5-9, 1995) San Francisco, California.
Foote, J., "Content-Bsed Retrieval of Music and Audio," Proceedings of SPIE, vol. 3229, pp. 138-147 (1997).
Liu, Z., et al., "Content-Based Indexing and Retrieval-By-Example in Audio," presented at ICME 2000 (Jul. 2000).
Liu, Z., et al., "A New Distance Measure for Probability Distribution Function of Mixture Type," ICASSP 2000 (May 2000).

(Continued)

*Primary Examiner*—Jeffrey A. Gaffin
*Assistant Examiner*—Hassan Mahmoudi
(74) *Attorney, Agent, or Firm*—Richard P. Lange

(57) ABSTRACT

The present invention computer method and apparatus determines music similarity by generating a K-means (instead of Gaussian) cluster signature and a beat signature for each piece of music. The beat of the music is included in the subsequent distance measurement.

48 Claims, 6 Drawing Sheets

OTHER PUBLICATIONS

Rubner, Y., et al., "The Earth Mover's Distance as a Metric for Image Retrieval," (Technical Report STAN-CS-TN-98-86). Computer Science Department, Stanford University. (Sep. 1998).

Martin, K., "Automatic Transcription of Simple Polyphonic Music: Robust Front End Processing," M. I. T. Media Laboratory Perceptual Computing Section Technical Report No. 399, presented at the Third Joint Meeting of the Acoustical Societies of America and Japan (Dec. 1996).

Foote, J., et al., "Methods for the Automatic Analysis of Music and Audio," FXPAL Technical Report FXPAL-TR-99-038, Xerox Corporation (1999).

Beat Sheet, A Weekly Report on the Convergence of Music and the Net, http://www.thestandard.com/newsletters/display/0,2098,112-160,00.html.

Gibson, B., "Apple audio experts defect to MongoMusic," MacNN, May 9, 2000. Also at http://www.macnn.com/features/mongo.shtml.

Pelleg, D., et al., "X-means: Extending K-means with Efficient Estimation of the Number of Clusters," in Proceedings ICML 2000 (2000).

Logan, B., "A Content-Based Music Similarity Function," (Report CRL 2001/02) Compaq Computer Corporation Cambridge Research Laboratory, Technical Report Series (Jun. 2001).

"Microsoft Acquires MongoMusic," Microsoft PressPass (Sep. 2000). Also at http://www.microsoft.com/presspass/press/2000/Sept00/MongoPR.asp.

"MSN Music Uses 'Sounds Like' Technology to Give Listerners the Music They Like," Microsoft PressPass (Apr. 1, 2001). Also at http://www.microsoft.com/presspass/features/2001/apr01/04-03msnmusic.asp.

Kruskal, J.B., et al., *Mulitdimensional Scaling*, Sage Publications, Beverly Hills, CA (1997) . Also at http://forrest.psych.unc.edu/teaching/p208a/mds/mds.html.

"MongoMusic Fans Include Microsoft," Forbes.com. Available at http://www.forbes.com/2000/09/09/feat2_print.html.

"Mood Music for the Cyber Set," CNN.com, Sep. 8, 2000. Available at http://www.cnn.com/2000/TECH/computing/09/08/mood.music.idg/index.html.

Logan, B., et al., "A Music Similarity Function Based on Signal Analysis," published in *IEEE International Conference on Multimedia and Expo*, Aug. 22-25, 2001.

Rabiner, L., *Fundamentals of Speech Recognition*, Prentice-Hall, Englewood Cliffs, New Jersey, pp. 116-117, 162-171, 182-191, 428-429 (1993).

Duda, R.O., *Pattern Classification*, Second Edition, John Wiley & Sons, Inc., New York, pp. 526-529 (2001).

* cited by examiner

MUSIC SIMILARITY FUNCTION BASED ON SIGNAL ANALYSIS

RELATED APPLICATION

This application claims the benefit of U.S. Provisional Application No. 60/245,417 filed Nov. 2, 2000, the entire teachings of which are incorporated herein by reference.

BACKGROUND OF THE INVENTION

With the advent of MP3 and other efficient compression algorithms, the way people store and access music is changing. It is now possible to carry hundreds of hours of music in a small portable device, raising new user interface (UI) issues of how to most effectively present these songs to the user. On a home appliance or through the web, the problem is compounded since users could potentially have access to thousands or millions of hours of music.

The efficiency of these compression algorithms means that it is now feasible for radio stations to broadcast tailored content to small groups of users. Yet tailoring this content by hand as is done today for traditional radio stations is clearly infeasible. Moreover, web-based music distribution could benefit enormously by being able to automatically recommend new songs which are similar (or dissimilar) to a user's choice. Currently, this is done by hand or based on "collaborative filtering" techniques which require a large amount of data collection.

The traditional and most reliable technique of determining music similarity is by hand. Collaborative filtering techniques are an extension to this that attempt to produce personal recommendations by computing the similarity between one person's preferences and those of (usually many) other people. A number of companies have systems which rely on collaborative filtering e.g., www.launch.com allows users to set up personal radio stations where they rate songs that they hear.

Many researchers have looked at the music indexing problem by analyzing Musical Instrument Digital Interface (MIDI) music data, musical scores or using crude pitch-tracking to find a "melody contour" for each piece of music. Similar songs hopefully have similar melody contours and can be found using string matching techniques, although the problem is still not trivial (e.g., Blackburn, S. and De Roure, D., "A Tool for Content Based Navigation of Music," *ACM Multimedia* 1998. McNab, R., Smith L., Witten, I., Henderson, C. and Cunningham, S., "Towards the Digital Music Library: Tune Retrieval From Acoustic Input," in *Proceedings Digital Libraries* '96, pp. 11–18, 1996. Ghias, A. Logan, J., Chamberlin, D., and Smith, B., "Query by Humming—Musical Information Retrieval in an Audio Database," in *Proceedings ACM Multimedia* 95, San Francisco, 1995). MIDI is a protocol describing how a piece of music is to be played on a synthesizer. It can be thought of as a set of instructions detailing each sound to be played. Conceptually, it is equivalent to having the musical score available.

Other researchers have focused on analyzing the music content directly. Blum et al. present an indexing system based on matching features such as pitch, loudness or Mel-frequency cepstral coefficients (MFCC) features of audio (Blum, T., Keislar, D., Weaton, J., Wold, E., "Method and Article of Manufacture for Content-Based Analysis, Storage, Retrieval, and Segmentation of Audio Information," U.S. Pat. No. 5,918,223, issued on Jun. 29, 1999.) Foote has designed a music indexing system based on histograms of MFCC features derived from a discriminatively trained vector quantizer (Foote, J., "Content-Based Retrieval of Music and Audio," *Proceedings of SPIE*, volume 3229, pp. 138–147, 1997.)

A more recent publication uses a technique to analyze audio based solely on content analysis (Z. Liu and Q. Huang, "Content-Based Indexing and Retrieval by Example in Audio," presented at ICME 2000, July 2000). They investigate the problem of finding speech by a particular speaker in a one hour program. Because the show is not segmented into different segments, they first segment the data into audio with similar characteristics using the Kullback Leibler distance. They then produce a Gaussian mixture model for the MFCC features of each segment.

They then use their own distance measure to compare their "signatures" and obtain audio similar to the desired query. (Liu, Z. and Huang, Q., "A New Distance Measure for Probability Distribution Function of Mixture Types," *ICASSP* 2000, May 2000). Their distance measure has been known in the vision research community for several years. (Y. Rubner, C. Tomasi, and L. Guibas. The Earth Mover's Distance as a Metric for Image Retrieval," Technical Report STAN-CS-TN-98-86, Computer Science Department, Stanford University, September 1998.)

Finally, several startups are working in the music similarity business and claim to at least partly use content-based analysis techniques. According to their website, CantaMetrix's (http://cantametrix.com) technology "analyzes the digital waveform of a piece of music, coding songs based on characteristics such as melody, rhythm and timbre to produce a digital 'fingerprint.' This information is then run through a 'psycho-acoustic model' based on responses from about 500 people who have rated a selection of songs based on psychological factors such as 'upbeatness' and 'energy.'" (See http://www.cnn.com/2000/TECH/computing/09/08/mood.music.idg/index.html). There is no demo available for this technology.

Another company called MongoMusic (http://www.mongomusic.com) has a working demo on the web that allows users to find songs which are "similar" to those requested. This company was acquired by Microsoft in September 2000 (see http://www.microsoft.com/presspass/press/2000/Sept00/MongoPR.asp). The technology was incorporated into a beta version of Microsoft MSN in April 2001 (see http://www.microsoft.com/PressPass/features/2001/apr01/04-03msnmusic. asp).

The original demo at http://www.mongomusic.com seemed to work quite well. It could return similar songs to a chosen song from a database of unknown size. (Possibly the database was of size 160000 if it's the same one referred to in http://www.forbes.com/2000/09/09/feat2_print.html. The beta version of Microsoft MSN (http://music.msn.com) appears to use MongoMusic's "sounds like" technology at the album rather than the song level.

There was some information on MongoMusic's original website about the workings of their technology. It appears to involve some human "quality assurance" after the original list of matches is returned. Here are some quotes from their press releases.

"[O]ne of the reasons the service works so well is that there is little human involvement in its Intuitive Music Search System [IMSS]," according to a spokesperson. "The differentiating factor between this and anything else that's out there at this time is that this is fundamentally based on the music itself, as opposed to being based on collaborative filtering or user preferences," he explains. He describes the patent-pending technology as a "semi-automated, semi-human-based system." Basically, IMSS matches songs based on musical characteristics such as tonality, rather than using pre-matched song lists. The company declines to elaborate further on its proprietary information (from http://www.thestandard.com/newletters/display/0,2098,112-160,00.html).

"The key to MongoMusic's future is a search technology that analyses music for certain attributes, such as tempo, mood, and beats-per-minute, so it can recommend similar songs that people might like," according to a press release. "The customization is based on the analysis of massive music libraries, of which Sony is the first recording company to sign on with MongoMusic." (From http://www.mongomusic.com/s/press_macnn_050900). Also available at http://www.macnn.com/features/mongo.shtml.)

"A team of 35 full-time musicologists, or 'groovers,' looks at the computer's decisions and tweak them based on their own expertise, but they rarely reject its recommendations. The team includes Jeoff Stanfield, who plays bass in an alternative band called Black Lab, and Colt Tipton, the world's fiddling champion."

"They may change the rankings of some tunes, or make some suggestions that are surprisingly right on—like a Beastie Boys song in the jazz category. But the computer analysis is really effective," says Colleen Anderson, vice president of marketing at MongoMusic. From http://www.forbes.com/2000/09/09/feat2_print.html.

SUMMARY OF THE INVENTION

The present invention overcomes the problems of the prior art and determines music similarity by generating a K-means (instead of Gaussian) cluster signature and a beat signature for each piece of music. The beat of the music is thus included in the subsequent distance measure. Briefly, determining music similarity by hand is clearly infeasible for the millions and millions of hours of music which will eventually be available through the web (if it isn't already). It is also infeasible for the hundreds of hours of music that a user may have in a personal collection. Collaborative filtering can go some way toward solving this problem but cannot quickly analyze new music. Also, it may be difficult to get reliable information from users who really just want to listen to songs and don't want the bother of rating each one. Analyzing purchasing rather than listening habits is another option but since today a piece of music is typically sold as part of a CD, this relies on enough users liking a piece of music so much that they pay enough for a CD. Also, the act of buying a CD or even a song does not always imply that the user liked it.

Techniques based on analyzing MIDI data or musical scores are limited to music for which this data is available in electronic form. This set is much smaller than the set of all music on the web. For simple monophonic music, pitch tracking might provide an automatically generated transcription. However, only limited success has been achieved for pitch-tracking of polyphonic music. (Martin, K., "Automatic Transcription of Simple Polyphonic Music: Robust Front End Processing," in *Proceedings of the Third Joint Meeting of the Acoustical Societies of America and Japan*, 1996.) Thus, reliably finding the melody in a complex arrangement is difficult or impossible using present technologies.

With the exception of Z. Liu and Q. Huang, "Content-Based Indexing and Retrieval by Example in Audio," presented at ICME 2000, July 2000 (and possibly CantaMetrix and MongoMusic's techniques) previously developed content-based analysis techniques use distance measures which are inferior to the one described in this invention. Blum et al. use Euclidean distance measures on the raw features or compute a Gaussian to describe them. This assumes that the sound clips are stationary which may be true for their database but is not true in general for a database of songs. Foote represents each sound by a histogram, where the histogram bins are fixed for the whole database of sounds. This means that some sounds (especially those previously unheard) may not be characterized well since all their information may be concentrated in only a couple of bins.

The present invention (and effectively Liu and Huang) computes the bins for each histogram for each song individually and then use the Earth Mover's Distance to compare histograms. This distance measure allows for histograms with different bins to be compared and has the additional advantage of allowing for partial matches (i.e., a song will match closely with an incomplete version of the same song). Results on an image database show this distance measure to be superior to a number of distance measures between histograms with fixed bins in Y. Rubner, C. Tomasi, and L. Guibas, "The Earth Mover's Distance as a Metric for Image Retrieval," Technical Report STAN-CS-TN-98-86, Computer Science Department, Stanford University, September 1998.

A method and system for determining similarity between a plurality of musical works is provided which includes obtaining respective digitized audio files of the plurality of musical works. For each musical work, at least two different representations from the corresponding audio file are formed, the different representations representing respective different aspects of the musical work. For a given musical work of interest, the steps include (a) comparing one of its two different representations to respective ones of the two different representations of the musical works in the plurality; (b) comparing the other of the two different representations of the given musical work to respective other ones of the two different representations of the musical works in the plurality; and (c) summing results of the comparisons in (a) and (b), wherein the summed results provide a quantitative indication of which musical works in the plurality are similar to the given musical work of interest.

In one embodiment, the step of forming at least two different representations includes forming a spectral representation and a beat representation for each musical work, the spectral representation representing instrumentation of the musical work and the beat representation representing rhythmic frequencies of the musical work.

The method can further include the step of preprocessing the audio files before forming the different representations for each musical work. The step of preprocessing may include omitting relatively long pauses.

In another embodiment, the method includes providing a respective reliability measure associated with each representation.

The step of summing may include weighting results of the comparisons as a function of reliability measures of the representations compared. In one embodiment, the plurality of musical works are displayed in a manner illustrating relative similarities among the plurality.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not nec

DETAILED DESCRIPTION OF THE INVENTION

The present invention audio similarity measure captures information about two important features of music: the instrumentation and the beat. The present invention uses a spectral-based distance measure to capture information about instrumentation and a rhythmic-based measure to capture information about the beat. The present invention combines these two similarity measures using a heuristically chosen weight to obtain the final similarity measure between songs. If desired, other non-audio-based similarity measures could also be included with appropriate weights at this stage of the algorithm. These include similarity measures based on textual information such as the song title, artists or lyrics, or collaborative filtering information.

Figure 1:
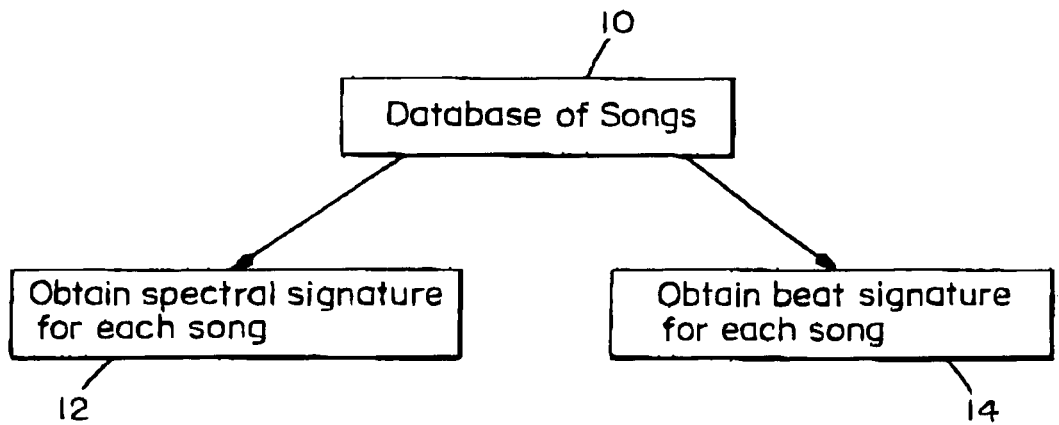
- FIG. 1 is a block diagram of the invention's first step in organizing a database of music.
Figure 2:
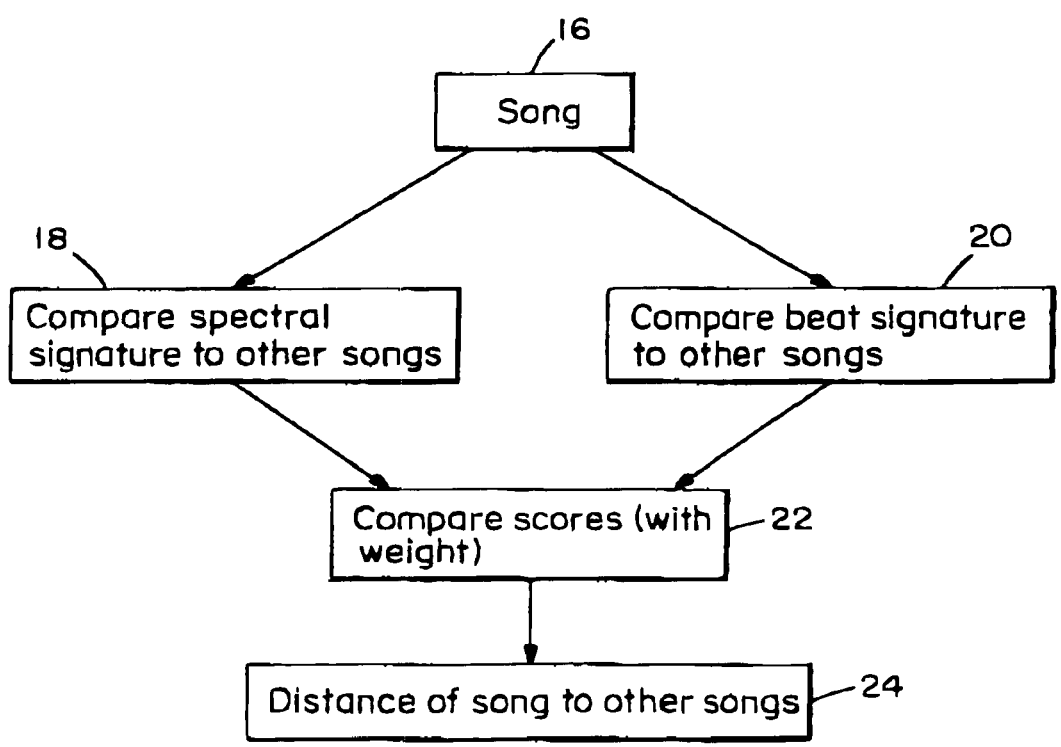
FIG. 2 is a block diagram of the invention's overall process of comparing a song to other songs in the database.

FIGS. 1 and 2 show the overall steps required to calculate the distance between songs in a music database. Given a database of songs 10, for each individual song 16, a spectral signature and a beat signature are obtained at steps 12 and 14 respectively. Then for each individual song 16, the spectral signature from step 12 and the beat signature from step 14 are compared to other songs at steps 18 and 20 respectively. The scores of each comparison at steps 18 and 20 are weighted and combined at step 22 to obtain the distance of song 16 to other songs 24.

Spectral Distance Measure

The present invention spectral distance measure captures information about the novelty of the audio spectrum. For each piece of music, the present invention computes a "signature" based on spectral features. The present invention then compares signatures using the Earth Movers Distance (EMD). (Y. Rubner, C. Tomasi, and L. Guibas, "The Earth Mover's Distance as a Metric for Image Retrieval," Technical Report STAN-CS-TN-98-86, Computer Science Department, Stanford University, September 1998.)

Figure 3:
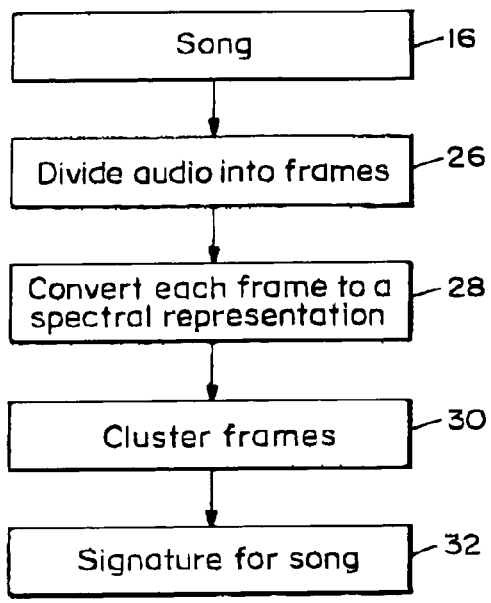
FIG. 3 is a block diagram of a process to obtain the spectral signature for a song employed in one embodiment.

The steps to obtain a spectral signature for a piece of music are as follows. The process is also shown in FIG. 3. For an individual song 16, divide the audio signal into fixed length and possibly overlapping segments called "frames" (step 26).

For each frame, obtain a spectral representation (step 28). Many representations are possible so long as the following criteria are satisfied: perceptually important parts of the signal are emphasized and a distance measure is available to compare one frame to another such that frames which sound similar are close to each other. One example of a suitable spectral representation is a vector of Mel-frequency cepstral coefficients (e.g., see Rabiner, L. and Juang, B., *Fundamentals of Speech Recognition*, Prentice Hall, 1993). Such a vector (spectral representation) is based on the discrete cosine transform of the log amplitude Mel-frequency spectrum and can be compared using the Euclidean distance measure. Other spectral measures can include using the amplitude spectrum directly or a representation based on MP3 coefficients. Possibly only a subset of spectral coefficients might be used. For example, the present invention typically uses 4–19 of a possibly 40 cepstral coefficients. It is also feasible to include delta (difference) coefficients as part of the feature vector as is typical in speech recognition applications (e.g., see Rabiner, L. and Juang, B., *Fundamentals of Speech Recognition*, Prentice Hall, 1993).

In one embodiment, each spectral representation is a plurality of Mel-frequency cepstral coefficients (MFCC's). A Mel is a psycho-acoustical unit of frequency well known to those skilled in the art. The invention method first performs a windowing function, e.g., apply a Hamming window, on each frame. A Hamming window essentially tapers the respective signal to zero at both the beginning and end of the frame, thereby minimizing any discontinuities. The invention method may also apply some type of pre-emphasis on the signal to reduce the amplitude range of the frequency spectrum. In one embodiment, a pre-emphasis coefficient of 0.97 is utilized. The time varying data for each frame is then subject to a Fast Fourier Transform function ("FFT") to obtain a frequency domain signal. The log amplitude of the frequency signal is warped to the Mel frequency scale and the warped frequency function subject to a second FFT to obtain the parameter set of MFCC's.

More specifically, the frequency domain signal for each frame may be run through a set of triangular filters. In one embodiment, an approximation to the Mel frequency scaling is used. In particular, forty triangular filters that range between 133 Hz and 6855 Hz are used. The first thirteen filters are linearly spaced, while the next 27 are log-spaced. Attached as Appendix A hereto is a description of the triangular filter parameters utilized in one embodiment. The resulting forty approximately Mel-frequency spaced components for each frame are then subject to a Discrete Cosine Transform (DCT) function to obtain the MFCC's. In other words, the results of the foregoing is a sequence of vectors, each of n-dimensions (e.g., 13). Each vector, moreover, represents a frame of the audio input and hence is a spectral representation usable to decipher the song's structure.

It is understood that the audio input may be subject to additional processing to reduce the computation power and storage space needed to analyze the respective signal. It should also be understood that other spectral representation parameters, besides MFCC's, can be utilized. For example, the invention method could be configured to extract spectrum, log spectrum or autoregressive parameters from the song signal for use in generating the spectral representations.

Returning to FIG. 3, given a sequence of spectral representations or frames for a given song, cluster these frames into groups which are similar (step 30). The number of clusters may be fixed for every song, in which case standard K-means clustering can be used (e.g., Duda, R., Hart, P. and Stork, D., *Pattern Classification*, John Wiley & Sons, 2000). Alternatively, the number of clusters chosen can be dependent on the song (e.g., Pelleg, D. and Moore, A., "X-means: Extending K-means with Efficient Estimation of the Number of Clusters," in *Proceedings ICML.* 2000, 2000). Regardless of how the K (or X) clusters are determined, these are then denoted the signature for the song.

The present invention obtains a spectral signature for every song of interest. If sufficient storage is available, the signatures only need to be calculated once and stored. The present invention then compares the spectral signatures for two different songs using the EMD. The EMD calculates the minimum amount of "work" required to "transform" one spectral signature into the other.

Let $P=\{(p_1,w_{p1}), \ldots, (p_m,w_{pm})\}$ be the first signature with m clusters where $p_i$ is the cluster representative (e.g., the mean and variance) and $w_{pi}$ is the weight of that cluster. Similarly, let $Q=\{(q_1,w_{q1}), \ldots, (q_n,w_{qn})\}$ be the second signature. Let $D=[d_{ij}]$ be the "ground distance" matrix where $d_{ij}$ is the distance between clusters $p_i$ and $q_j$. For example, we can use a symmetric form of the Kullback Leibler (KL) distance. Assuming Gaussian distributions with diagonal covariance matrices, and that dimension x of cluster $p_i$ has mean $\mu_{ix}$ and variance $\sigma^2_{ix}$ and dimension x of cluster $q_j$ has mean $\mu_{jx}$ and variance $\sigma^2_{jx}$ then this would take the form:

$$dij = \sum_{\forall \dim x} [\sigma^2_{ix}/\sigma^2_{jx} + \sigma^2_{jx}/\sigma^2_{ix} + (\mu_{ix} - \mu_{jx})^2 \cdot (1/\sigma^2_{ix} + 1/\sigma^2_{jx}) - 2]. \quad (1)$$

Let $F=[fij]$ with fij being the "flow" between pi and qj that minimizes the overall cost defined by:

$$Work = \sum_{i=1}^{m} \sum_{j=1}^{n} d_{ij} f_{ij} \quad (2)$$

subject to a series of constraints. This problem can be formulated as a linear programming problem for which efficient solutions exist. Having solved for F, the EMD is calculated as:

$$EMD(P, Q) = \frac{\sum_{i=1}^{m} \sum_{j=1}^{n} d_{ij} f_{ij}}{\sum_{i=j}^{m} \sum_{j=1}^{n} f_{ij}}. \quad (3)$$

Rhythm Similarity Measure

Information about the rhythm of each song is obtained using a measure based on self-similarity. For each song, the beat spectrogram is calculated (step 40) (J. Foote, "Methods for the Automatic Analysis of Music and Audio," Technical Report FXPAL-TR-99-038, Xerox Corporation, 1999). A similarity measure is then used to compare histograms of a quantity derived from this.

Figure 4:
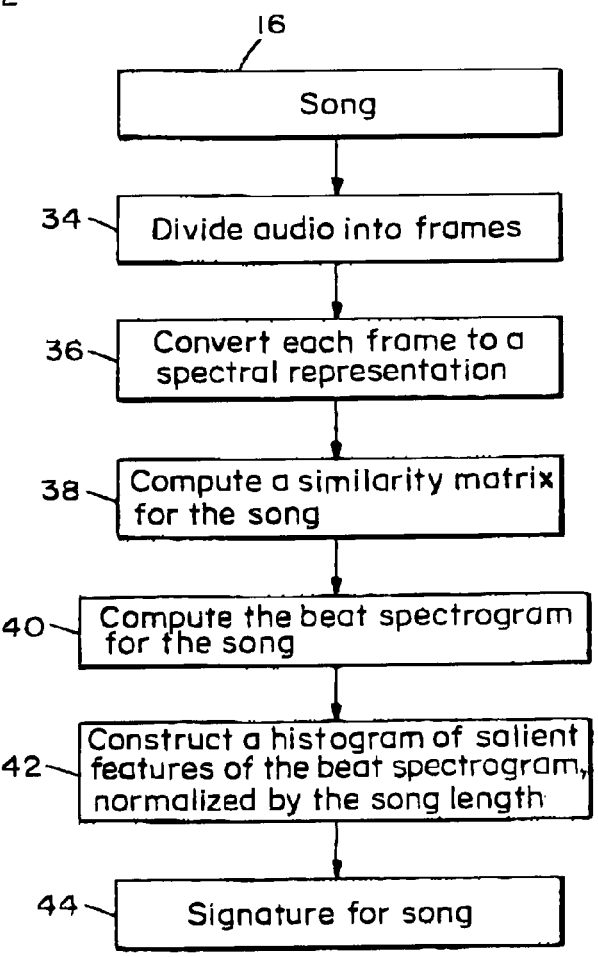
FIG. 4 is a block diagram of a process to obtain beat signature for a song employed in one embodiment.

Each song is processed as follows to obtain "beat histograms". This process is shown in FIG. 4 and described below. In step 34, the audio signal is divided into fixed length and possibly overlapping segments called "frames". In step 36, for each frame, a spectral representation is obtained. As discussed above, many representations are possible so long as the following criteria are satisfied: perceptually important parts of the signal are emphasized and a distance measure is available to compare one frame to another such that frames which sound similar are close to each other. Again, an example of a suitable spectral representation is Mel-frequency cepstral coefficients.

For a song of n frames, construct the nxn "similarity" matrix S=[sij] (step 38). Element sij is the similarity between the ith and jth frames in the song calculated using the distance measure corresponding to the spectral representation used in step 36 above. For example, if Mel frequency cepstral coefficients are used then a Euclidean distance measure could be used to calculate each sij. In reality only part of this matrix is used in step 38 so computational savings are possible.

Each diagonal of S is a vector describing similarity of lag 1 where 1 is the distance from the major diagonal. For example, the main diagonal describes similarity of lag 0 or self-similarity. For a short section of each song, for example N=6 seconds, S is used to calculate the average similarity for lags 0 to L. That is, the L major diagonals are averaged for the similarity matrix S for t=t0 to t=t0+N. This is repeated with a lag of say 1s to give the beat spectrogram as described in (J. Foote, Methods for the Automatic Analysis of Music and Audio, Technical Report FXPAL-TR-99-038, Xerox Corporation, 1999).

For each song, the present invention then constructs a histogram of important features exhibited in the beat spectrogram (step 42). For example, the present invention can construct a histogram of the distance between peaks in the averaged lag vectors.

Finally, this histogram is normalized to account for the total number of frames in each song to obtain a signature for the song (step 44).

The above process (steps 34, 36, 38, 40, 42, 44) is repeated to obtain "beat histograms" based signatures (step 44) for each song 16 of interest. Again, if sufficient storage is available, the histograms need only be calculated once and stored. For each pair of histograms, the distance between them is calculated. Any histogram-based distance measure can be used so long as it gives meaningful results. That is, songs with similar rhythm have "close" beat histograms.

For histograms of distances between peaks, the following distance measure is used. For each pair of songs, calculate the closest distance between them. This distance is the minimum of the sum of absolute differences between the bins of each histogram calculated over a range of "scalings" of each histogram. A function may also be applied to weight certain bins. The present invention investigates different scalings of the histograms to allow for slight differences in tempo between songs. For each scale factor, Applicants "expand" or "resample" one histogram by that factor and compare it to the other. Applicants then expand the second histogram by the factor and compare it to the unscaled version of the first one. The distance function can also include a weighting factor to favor lower amounts of scaling.

Combined Similarity Measure

The total similarity measure (of step 22 in FIG. 2) between two songs is now formed by the weighted sum of the spectral and rhythmic measures defined in step 44 above. The weights may be determined experimentally. In one embodiment, the ratio between the rhythmic weight and the spectral weight ranges from about 0:1 to 0.1:1.0. In a particular embodiment, the ratio between the rhythmic weight and the spectral weight is about 0.01:1.0. If desired, other similarity measures could be included with appropriate weights as mentioned above.

Generating a Set of Similar Songs

Using the similarity measure above, a variety of heuristics can be used to generate a set of similar songs of size N for a given song or songs. The simplest method is to take the closest N songs to the given song according to the similarity measure.

Alternatively, the top M songs could be taken from this list and the closest N songs found to these. The N songs returned could be those with the highest total score found by summing the scores for each song in the M+1 lists (for a similarity measure that returns 0 for an identical song, the sense of the scores will have to be first reversed by subtracting all scores from a large number). This principal of summing scores over M+1 lists could also be used when the user is allowed to pick greater than one song initially.

Another alternative is to combine scores from slightly different parameterizations of the distance measures. For example, if cepstral features are used in the spectral similarity measure, the lists of N closest songs for 5, 10 and 20 cepstral features could be combined, possibly with weights reflecting the confidence in each method and the best songs occurring in these three lists could be returned.

The user might also be allowed to specify negative choices, e.g., "don't give me songs like this". In this case, the similarity measure could be then be inverted to return songs very far away from the given song.

EXAMPLE 1

Applicants have implemented a version of their algorithm in software and tested it on a database of over 8000 songs drawn from a wide range of styles. Each song in the database is labeled with the genre, song name, album name, and artist name. The genre included one of the following: Blues, Celtic, Classical, Comedy, Country, Folk, Jazz, New Age, Rap, Rock, Soundtrack, Techno, Various Artists, Vocal Word. The genres are assigned according to the All Music Guide (AMG) database (www.allmusic.com). The details of the implementation are given below.

Spectral Distance Measure

For each song, the present invention computes a signature based on k-means clustering of Mel frequency cepstral coefficients. The detailed steps are as follows.

0. Uncompress the given MP3 files and convert to monophonic audio sampled at 16 kHz.
1. Divide the audio signal into frames of 25.6 ms overlapped by 10 ms.
2. Convert each frame to 40 Mel-spectral coefficients. Then take the logarithm and the discrete cosine transform to obtain 40 cepstral coefficients. Of these, only the first 5–30 are used in the final system. The present invention disregards the zeroth cepstral coefficient which contains magnitude information.
3. Cluster the sequence of cepstral coefficients into 16 clusters using standard K-means clustering. This set of clusters is the signature for the song.

The present invention then compares signatures for each song to each other song using the EMD. The present invention uses the symmetric K–L distance described in Equation 1 as the ground distance in the EMD.

Rhythm Similarity Measure

For each song the "beat histogram" is computed as follows.

1. Start with the cepstral features computed above.
2. For steps of 1s (100 frames), compute the required slice of the similarity matrix S such that similarities for lags up to 6s can be computed.
3. Average the lag vectors for the 1s steps.
4. For groups of six 1s steps, Applicants then average the corresponding averaged lag vectors. The result is the beat spectrogram for the song.
5. Applicants then construct a histogram of the distances between all permutations of peaks found in the beat spectrogram weighted by a reliability factor. (The distance between all permutations of peaks is more robust to a "bad" peak than a simple distance between peaks). The present invention finds peaks by a very simple algorithm where if the beat at index j is greater than the beats at j−1 and j+1 that beat is considered a peak. The reliability of a peak distance is proportional to the "prominence"—the amount by which the lower peak is greater than the lowest point of the valley between the two peaks.
6. Finally, the present invention normalizes this histogram to account for the total number of frames in each song.

The above process is repeated to obtain "beat histograms" for each song of interest. For each pair of histograms, the present invention calculates the closest distance between them. This distance is the minimum of the sum of absolute differences between each histogram bin calculated over a range of "scalings" of each histogram. The present invention also uses a quadratic weighting function to emphasize lower bins. For the 600 bins in each histogram, this function takes the form $y=x*x*0.8/600+0.2$. The present invention investigates different scalings of the histograms to allow for slight differences in tempo between songs. For each scale factor, Applicants "expand" or "resample" one histogram by that factor and compare it to the other. Applicants then expand the second histogram by the factor and compare it to the unscaled version of the first one. A typical range of scales is 1.0 to 1.4.

Combined Similarity Measure

The total similarity measure between two songs is now formed by the weighted sum of the spectral and rhythmic measures defined above. The weights may be determined experimentally. In one embodiment, the ratio between the rhythmic weight and the spectral weight ranges from about 0:1 to 0.1:1.0. In a particular embodiment, the ratio between the rhythmic weight and the spectral weight is about 0.01: 1.0. Since a score of 0 corresponds to an identical song for both distance measures, the present invention reverses the sense of the scores by subtracting them from a large number before adding them together.

Generating a Set of Similar Songs

Using the similarity measure above, a variety of heuristics can be used to generate a set of similar songs of size N for a given song or songs. The simplest method is to take the closest N songs to the given song according to the similarity measure.

Visually Displaying a Set of Songs

In alternative embodiments, a set of musical works, e.g., songs or musical pieces, is displayed graphically by the present invention. To display a set of music pieces and their similarities/dissimilarities graphically, each song is transformed to a real two-dimensional point using Multi-dimensional scaling (MDS). MDS (e.g., F. W. Young and R. M. Hamer, *Multidimensional Scaling: History, Theory and Applications*, Erlbaum 1987 or refer to http://forrest.psych.unc.edu/teaching/p208a/mds/mds.html for an online extract by F. W. Young from Kotz-Johnson (Ed.) *Encyclopedia of Statistical Sciences*, Volume 5, John Wiley & Sons, 1985) is a standard technique which transforms a series of objects, about which only relative distance information is available, to a series of K-dimensional points. The mapping attempts to preserve the relative distances between objects such that objects which are known to be "close" according to the distance measure are mapped to points which are "close" in K dimensional space.

Figure 5:
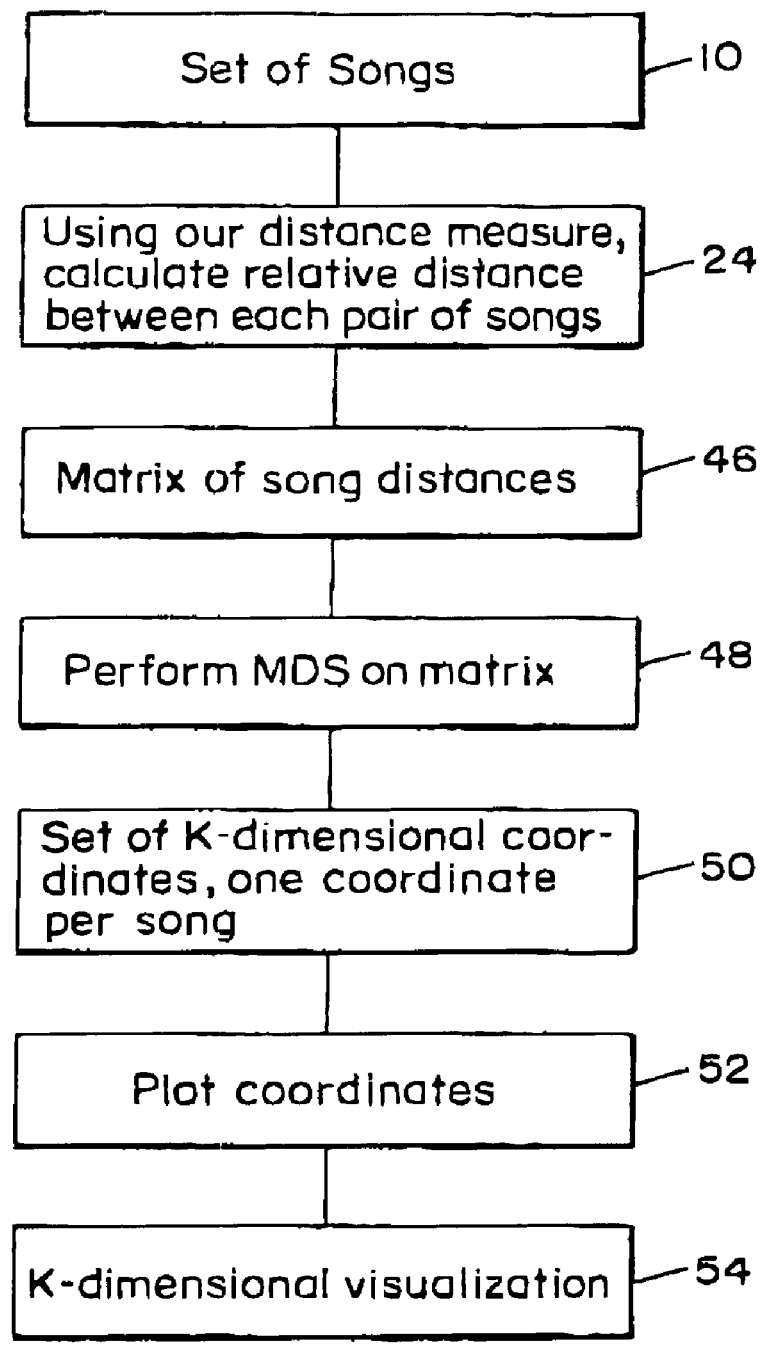
FIG. 5 is a block diagram of a process to obtain a K-dimensional visualization of a set of songs.

FIG. 5 shows the overall steps required to visualize a set of musical pieces using the inventors' principles and techniques. To obtain a visual representation of a music database 10, applicants construct a matrix of song similarity 46 according to the above-described distance measures 24, of FIGS. 1–4. Next, step 48 (FIG. 5) performs an MDS on the matrix 46 to obtain the coordinates in K-dimensional space for each song. In the resulting set 50 of K dimensional coordinates, there is one coordinate per song. These coordinates (i.e., points) are then displayed 52 using one of a number of graphing packages (e.g., Matlab from http://www.mathworks.com/products/matlab/) or a specialized package can be created to provide K-dimensional visualization 54. When displaying the songs, the points may be labeled according to song name, album, artist, genre or any other meaningful label. The points may also be colored or otherwise visually distinguished from each other according to these labels.

EXAMPLE 2

Figure 6:
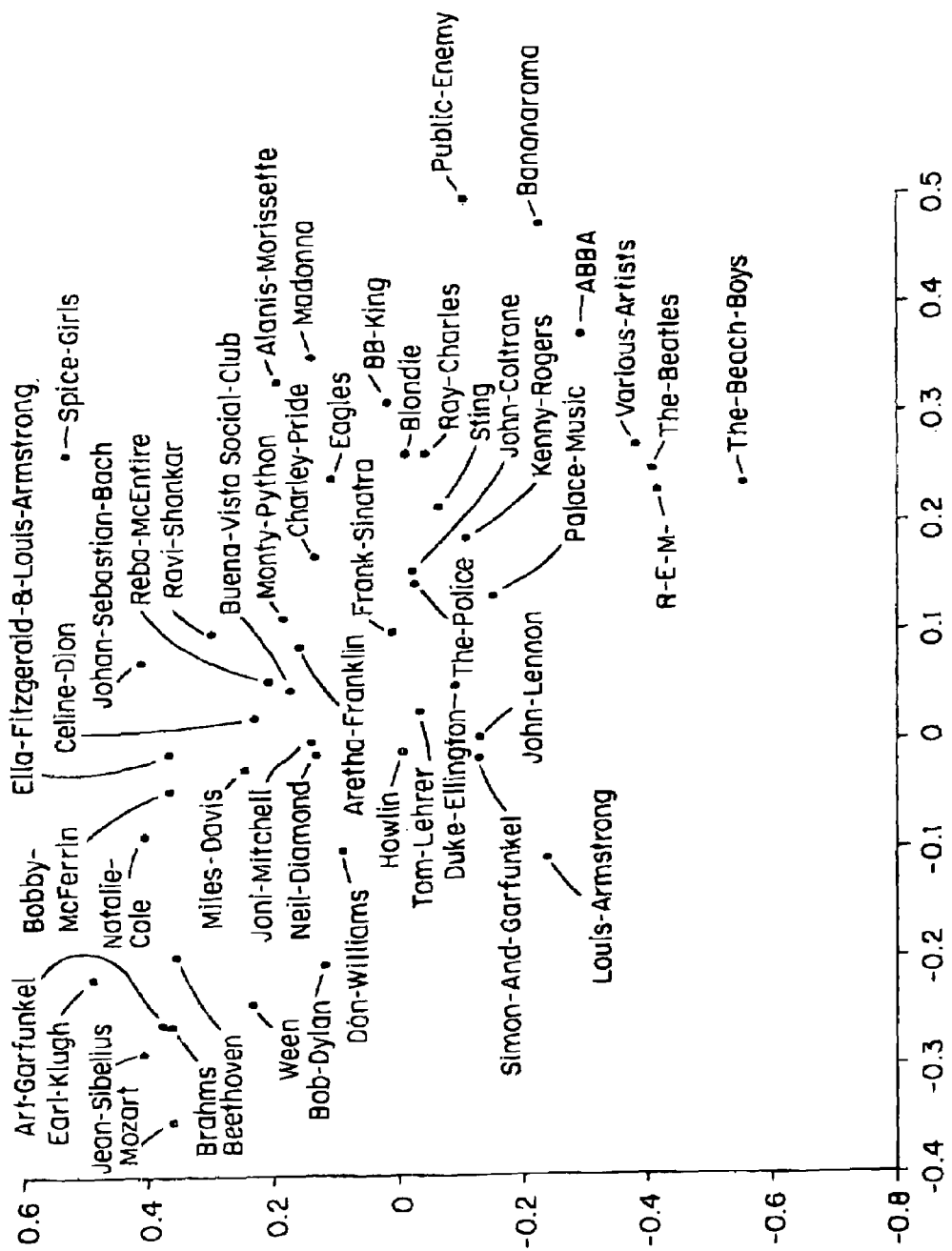
FIG. 6 illustrates the visualization of about 50 songs by well-known artists in accordance with the present invention.

FIG. 6 shows the graphical visualization of about 50 songs by well-known artists according to the principles of the present invention. It is seen that points corresponding to respective similar or same genres are fairly consistent and that in many cases, similarly sounding artists are grouped (i.e. automatically clustered) together. The Table below lists the songs visualized (displayed) in FIG. 6.

| Genre | Artist | Song |
|---|---|---|
| Jazz | Bobby McFarrin | Don't Worry-Be Happy |
| Jazz | Louis Armstrong | Hello Dolly |
| Rock | Alanis Morisette | You Oughta Know |
| Rock | Bob Dylan | Blowin' in the Wind |
| Rock | John Lennon | Oh Yoko |
| Rock | Ween | I'm Holding You |
| Comedy | Tom Lehrer | The Vatican Rag |
| Comedy | Monty Python | Lumberjack Song |
| Classical | Wolfgang Amadeus Mozart | Requiem |
| Classical | Jean Sibelius | Pelleas et Melisande-Melisande |
| Techno | Various Artists | Believe |
| Jazz | Duke Ellington | Midriff |
| Jazz | John Coltrane | Seraphic Light |
| Country | Palace Music | Ohio River Boat Song |
| Vocal | Frank Sinatra | I've Got You Under My Skin |
| Blues | Howlin Wolf | Red Rooster |
| Rock | R-E-M | Shiny Happy People |
| Rock | The Beatles | All My Loving |
| Rock | Aretha Franklin | Think |
| Rock | Radiohead | Creep |
| Rock | Sting | If You Love Somebody Set Them Free |
| Rock | The Beach Boys | Help Me, Rhonda |
| Rock | Bananarama | Venus |
| Rock | Madonna | Like a Virgin |
| Rock | Spice Girls | Wannabe |
| Rock | The Police | Message in a Bottle |
| Rock | Blondie | Heart of Glass |
| Rock | Eagles | Hotel California |
| Country | Charley Pride | After me, after you |
| Country | Don Williams | Fly Away |
| Country | Reba McEntyre | Between a Woman and a Man |
| Rap | Public Enemy | B Side Wins Again |
| Blues | BB King | Sweet Little Angel |
| Blues | Celine Dion | All By Myself |
| Classical | Beethoven | Allegretto |

-continued

| Genre | Artist | Song |
|---|---|---|
| Classical | Brahms | Piano Concerto No. 2 in B flat. Op 83 |
| Classical | Johann Sebastian Bach | Allegro |
| Rock | ABBA | Dancing Queen |
| Jazz | Miles Davis | Blues for Pablo |
| Jazz | Earl Klugh | Winter Rain |
| Jazz | Ella Fitzgerald & Louis Armstrong | Cheek to Cheek |
| Jazz | Natalie Cole | As Time Goes By |
| Country | Kenny Rogers | The Gambler |
| Blues | Ray Charles | Hit The Road Jack |
| Rock | Art Garfunkel | Bright Eyes |
| Rock | Neil Diamond | September Morn |
| World | Ravi Shankar, Ali Akbar Khan | Raga Palas Kafi |
| World | Buena Vista Social Club | Candela |
| Folk | Joni Mitchell | Car On A Hill |
| Folk | Simon and Garfunkel | Bridge Over Troubled Water |

Figure 7:
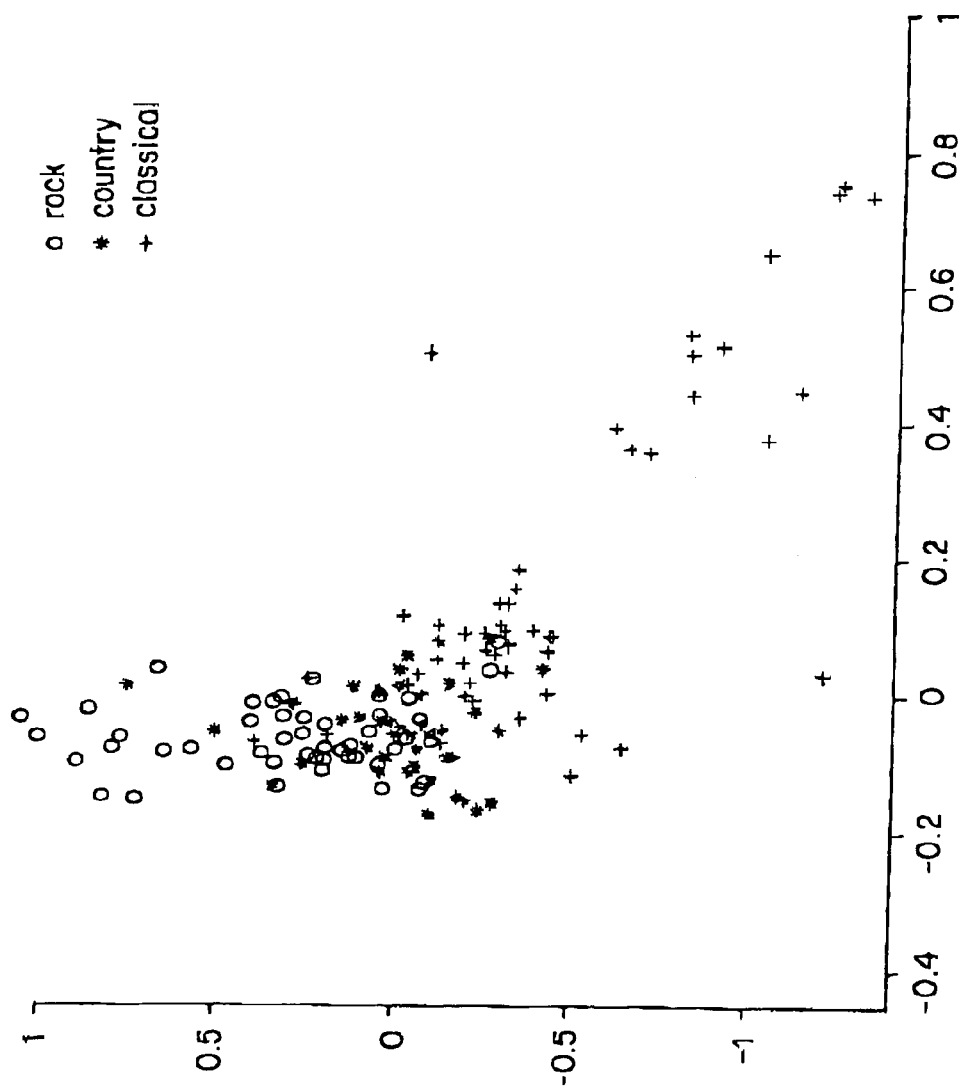
FIG. 7 shows the present invention visualization of 150 randomly chosen songs, 50 songs from each of Rock, Country, and Classical music categories.

FIG. 7 shows the present invention visualization of 150 randomly chosen songs from the Rock, Country, and Classical categories (50 songs from each category). Again, the songs are roughly clustered into respective genres according to the present invention's determination of musical similarity. This technique can form the basis of an interesting user interface, such as a web browsing interface at http://www.webmap.com.

Figure 8:
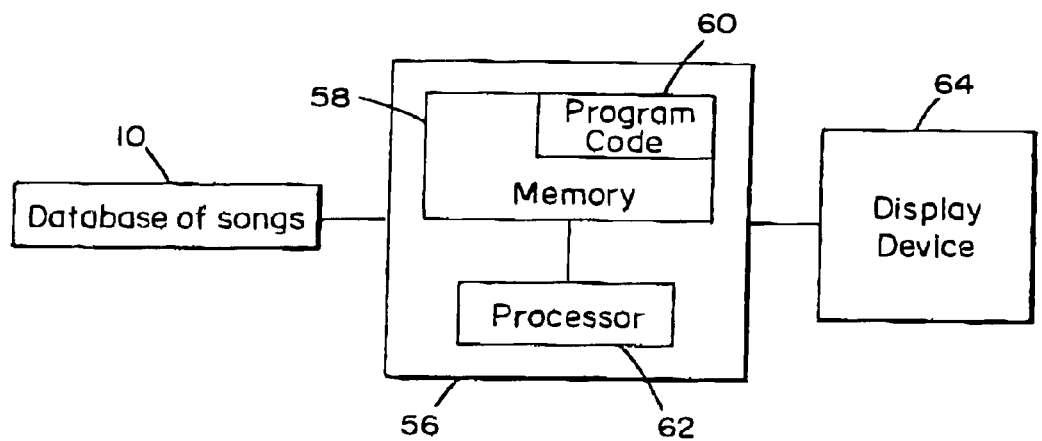
FIG. 8 is a block diagram of a system used to implement the steps of the present invention in accordance with one embodiment.

FIG. 8 illustrates, in block diagram form, a system used to implement the steps of the present invention in accordance with one embodiment. In one embodiment, the database of songs 10 is stored on disc, hard drive, server, compact disc, etc. The songs 10 are digitized and transferred to a computer system 56 which includes a working memory 58 having program code 60 that implements the steps of the present invention. A processor 62 is used to execute commands of the program code 60. Output from the executed code drives display device 64 which renders a visual display of the songs in accordance with the present invention. It is understood that the program code 60 can be stored remotely, for example, at a server connected to the processor 62 over a local or global network (e.g. the Internet).

While this invention has been particularly shown and described with references to preferred embodiments thereof, it will be understood by those skilled in the art that various changes in form and details may be made therein without departing from the scope of the invention encompassed by the appended claims.

For example, the term "song" is used above for purposes of illustrating the present invention and not limitation. Other musical works or compositions or pieces of music are suitable subjects.

APPENDIX A

| Filter Number | Low Frequency | Mid Frequency | High Frequency |
|---|---|---|---|
| 1 | 133.333 | 200.00 | 266.667 |
| 2 | 200.000 | 266.667 | 333.333 |
| 3 | 266.667 | 333.333 | 400.000 |
| 4 | 333.333 | 400.00 | 466.667 |
| 5 | 400.000 | 466.667 | 533.333 |
| 6 | 466.667 | 533.333 | 600.000 |
| 7 | 533.333 | 600.000 | 666.667 |
| 8 | 600.000 | 666.667 | 733.333 |
| 9 | 666.667 | 733.333 | 800.000 |
| 10 | 733.333 | 800.000 | 866.667 |

APPENDIX A-continued

| Filter Number | Low Frequency | Mid Frequency | High Frequency |
|---|---|---|---|
| 11 | 800.000 | 866.667 | 933.333 |
| 12 | 866.667 | 933.333 | 1000.000 |
| 13 | 933.333 | 1000.000 | 1071.170 |
| 14 | 1000.000 | 1071.170 | 1147.406 |
| 15 | 1071.170 | 1147.406 | 1229.067 |
| 16 | 1147.406 | 1229.067 | 1316.540 |
| 17 | 1229.067 | 1316.540 | 1410.239 |
| 18 | 1316.540 | 1410.239 | 1510.606 |
| 19 | 1410.239 | 1510.606 | 1618.117 |
| 20 | 1510.606 | 1618.117 | 1733.278 |
| 21 | 1618.117 | 1733.378 | 1856.636 |
| 22 | 1733.278 | 1856.636 | 1988.774 |
| 23 | 1856.636 | 1988.774 | 2130.316 |
| 24 | 1988.774 | 2130.316 | 2281.931 |
| 25 | 2130.316 | 2281.931 | 2444.337 |
| 26 | 2281.931 | 2444.337 | 2618.301 |
| 27 | 2444.337 | 2618.301 | 2804.646 |
| 28 | 2618.301 | 2804.646 | 3004.254 |
| 29 | 2804.646 | 3004.254 | 3218.068 |
| 30 | 3004.254 | 3218.068 | 3447.099 |
| 31 | 3218.068 | 3447.099 | 3692.430 |
| 32 | 3447.099 | 3692.430 | 3955.221 |
| 33 | 3692.430 | 3955.221 | 4236.716 |
| 34 | 3955.221 | 4236.716 | 4538.244 |
| 35 | 4236.716 | 4538.244 | 4861.232 |
| 36 | 4538.244 | 4861.232 | 5207.208 |
| 37 | 4861.232 | 5207.208 | 5577.807 |
| 38 | 5207.208 | 5577.807 | 5974.781 |
| 39 | 5577.807 | 5974.781 | 6400.008 |
| 40 | 5974.781 | 6400.008 | 6855.499 |

What is claimed is:

1. A method of processing a database of musical works, comprising:
   obtaining a digitized audio file for each musical work;
   obtaining a spectral signature based on spectral features for each audio file;
   obtaining a rhythmic beat representation for each audio file;
   for each musical work, summing the spectral signature and the rhythmic beat representation; and
   determining a similarity of the plurality of musical works based on the summed results.

2. The method of claim 1, further comprising weighting the summed results.

3. The method of claim 1, further comprising visually displaying on a display device the plurality of musical works including indicating the determined similarities.

4. A computer program product for determining similarity between a plurality of musical works, the computer program product including a computer usable medium having computer readable code thereon, including program code which:
   obtains respective digitized audio files of the plurality, and forms (i) a spectral signature based on spectral features from the corresponding audio file and (ii) a rhythmic beat representation from the corresponding audio file; and
   for a given musical work of interest:
   (a) compares its spectral signature to the spectral signatures of the musical works in the plurality;
   (b) compares its rhythmic beat representation to the rhythmic beat representations of the musical works in the plurality; and
   (c) sums, including respective weighting of results of the comparison in (a) and (b), the summed results providing an indication of which musical works in the plurality are similar to the given musical work of interest.

5. A computer data signal embodied in a carrier wave for determining similarity between a plurality of musical works, comprising:
   program code for obtaining digitized audio files of the plurality, and for each musical work in the obtained digitized audio files, the program code forms (i) a spectral signature based on spectral features from the corresponding audio file and (ii) a rhythmic beat representation from the corresponding audio file; and
   for a given musical work of interest, program code that:
   (a) compares its spectral signature to the spectral signatures of the musical works in the plurality;
   (b) compares its rhythmic beat representation to the rhythmic beat representations of the musical works in the plurality; and
   (c) sums, including respective weighting of results of the comparison in (a) and (b), the summed results providing an indication of which musical works in the plurality are similar to the given musical work of interest.

6. A method for determining similarity between a plurality of musical works comprising the steps of:
   obtaining respective digitized audio files of the plurality of musical works;
   for each musical work in the plurality, forming (i) a spectral signature based on spectral features from the corresponding audio file and (ii) a rhythmic beat representation from the corresponding audio file;
   for a given musical work of interest:
   (a) comparing its spectral signature to the spectral signatures of the musical works in the plurality;
   (b) comparing its rhythmic beat representation to the rhythmic beat representations of the musical works in the plurality; and
   (c) summing, including respective weighting of results of the comparisons in (a) and (b), said summed results providing an indication of which musical works in the plurality are similar to the given musical work of interest.

7. The method of claim 6, wherein forming a spectral signature includes dividing the corresponding audio file into a plurality of frames.

8. The method of claim 7, further comprising converting each frame to a spectral representation to obtain a plurality of spectral representations for the audio file.

9. The method of claim 8, further comprising clustering the spectral representations of the audio file to obtain the spectral signature for the audio file.

10. The method of claim 9, further comprising comparing the spectral signatures of two different audio files using an Earth Mover's Distance.

11. The method of claim 8, wherein the spectral representation includes a vector of Mel-frequency cepstral coefficients.

12. The method of claim 8, wherein each spectral representation includes a plurality of Mel-frequency cepstral coefficients.

13. The method of claim 7, further comprising performing a windowing function on each frame.

14. The method of claim 7, further comprising applying a Hamming window on each frame.

15. The method of claim 7, further comprising applying a pre-emphasis on each frame.

16. The method of claim 15, further comprising subjecting data from each frame to a Fast Fourier Transform function to obtain a frequency domain signal for each frame.

17. The method of claim 16, further comprising warping a log amplitude of each frequency signal to a Mel-frequency scale.

18. The method of claim 17, further comprising subjecting the warped frequency function to a second Fast Fourier Transform to obtain a parameter set of Mel-frequency cepstral coefficients.

19. The method of claim 17, further comprising subjecting the frequency domain signal for each frame to a set of triangular filters to obtain a plurality of Mel-frequency spaced components.

20. The method of claim 19, further comprising subjecting the Mel-frequency spaced components to a discrete cosine transform function to obtain a plurality of Mel-frequency cepstral coefficients.

21. The method of claim 6, wherein forming a rhythmic beat representation includes dividing the corresponding audio file into a plurality of frames.

22. The method of claim 21, further comprising converting each frame to a spectral representation to obtain a plurality of spectral representations for the audio file.

23. The method of claim 22, wherein each spectral representation includes a plurality of Mel-frequency cepstral coefficients.

24. The method of claim 22, further comprising computing a similarity matrix for the audio file.

25. The method of claim 24, further comprising computing a beat spectrogram for the audio file.

26. The method of claim 25, further comprising constructing a histogram of the beat spectrogram.

27. The method of claim 26, further comprising normalizing the histogram to account for the total number of frames of the audio file.

28. The method of claim 27, further comprising calculating a distance between a pair of histograms.

29. The method of claim 28, wherein calculating the distance includes calculating the closest distance between the pair of histograms.

30. The method of claim 29, wherein the closest distance is the minimum of the sum of absolute differences between bins of each histogram calculated over a range of scalings of each histogram.

31. The method of claim 30, further comprising applying a function to each histogram to weight certain bins.

32. The method of claim 31, further comprising scaling each histogram at least twice to allow for slight differences between musical works.

33. The method of claim 32, wherein for each scale factor, one histogram is resampled by a factor and compared to the unscaled histogram.

34. The method of claim 6, further comprising generating a set of similar musical works for the given musical work of interest.

35. The method of claim 34, further comprising visually displaying on a display device, the musical works in a manner illustrating relative similarities or dissimilarities of the musical works.

36. The method of claim 6, further comprising calculating a relative distance between each pair of musical works.

37. The method of claim 36, further comprising constructing a matrix of song similarity based on the relative distance.

38. The method of claim 37, further comprising performing a Multi-dimensional scaling on the matrix to obtain coordinates in K-dimensional space for each musical work, one coordinate per song.

39. The method of claim 38, further comprising plotting the coordinates.

40. A method for determining similarity between a plurality of musical works comprising:
obtaining respective digitized audio files of the plurality of musical works;
for each musical work, forming at least two different representations from the corresponding audio file, the different representations representing respective different aspects of the musical work, one of the representations being a spectral signature based on spectral features in the audio file;
for a given musical work of interest:
(a) comparing one of its two different representations to respective ones of the two different representations of the musical works in the plurality;
(b) comparing the other of the two different representations of the given musical work to respective other ones of the two different representations of the musical works in the plurality; and
(c) summing results of the comparisons in (a) and (b), said summed results providing a quantitative indication of which musical works in the plurality are similar to the given musical work of interest.

41. The method of claim 40, wherein the step of forming at least two different representations includes forming a beat representation for each musical work, the spectral signature representing instrumentation of the musical work and the beat representation representing rhythmic frequencies of the musical work.

42. The method of claim 40, further comprising the step of preprocessing the audio files before forming the different representations for each musical work.

43. The method of claim 42, wherein the step of preprocessing includes omitting relatively long pauses.

44. The method of claim 40, further comprising providing a respective reliability measure associated with each representation.

45. The method of claim 40, wherein the step of summing includes weighting results of the comparisons as a function of reliability measures of the representations compared.

46. The method of claim 40, further comprising visually displaying the plurality of musical works on a display device, in a manner illustrating relative similarities and dissimilarities among the plurality.

47. A computer system comprising:
a processor;
a memory system connected to the processor; and
a computer program, in the memory, which determines similarity between a plurality of musical works by:
obtaining respective digitized audio files of the plurality of musical works;
for each musical work, forming (i) a spectral signature based on spectral features from the corresponding audio file and (ii) a rhythmic beat representation from the corresponding audio file;
for a given musical work of interest:
(a) comparing its spectral signature to the spectral signatures of the musical works in the plurality;
(b) comparing its rhythmic beat representation to the rhythmic beat representations of the musical works in the plurality; and
(c) summing, including respective weighting of results of the comparisons in (a) and (b), said summed results providing an indication of which musical works in the plurality are similar to the given musical work of interest.

48. A system for determining similarity between a plurality of musical works, the system comprising:

means for obtaining respective digitized files of the plurality of musical works;

for each musical work, means for forming (i) a spectral signature based on spectral features from the corresponding audio file and (ii) a rhythmic beat representation from the corresponding audio file;

for a given musical work of interest:
  (a) means for comparing its spectral signature based on spectral features to the spectral signatures of the musical works in the plurality;
  (b) means for comparing its rhythmic beat representation to the rhythmic beat representations of the musical works in the plurality; and
  (c) means for summing, including respective weighting of results of the comparisons in (a) and (b), the summed results providing an indication of which musical works in the plurality are similar to the given musical work of interest.

\* \* \* \* \*